(12) United States Patent
Kumar et al.

(10) Patent No.: US 8,417,989 B2
(45) Date of Patent: Apr. 9, 2013

(54) METHOD AND SYSTEM FOR EXTRA REDUNDANCY IN A RAID SYSTEM

(75) Inventors: Ranjan Kumar, Bokaro Steel (IN); Sunny Koul, Bangalore (IN); Gururaj Shivashankar Morabad, Belgaum (IN)

(73) Assignee: LSI Corporation, Milpitas, CA (US)

( * ) Notice: Subject to any disclaimer, the term of this patent is extended or adjusted under 35 U.S.C. 154(b) by 5 days.

(21) Appl. No.: 12/905,086

(22) Filed: Oct. 15, 2010

(65) Prior Publication Data

US 2012/0096309 A1    Apr. 19, 2012

(51) Int. Cl.
*G06F 11/00* (2006.01)
(52) U.S. Cl. ..................... 714/6.23; 714/47.2
(58) Field of Classification Search .......... 714/6.22, 714/6.23, 6.24, 47.2
See application file for complete search history.

(56) References Cited

U.S. PATENT DOCUMENTS

| | | | |
|---|---|---|---|
| 5,727,144 A * | 3/1998 | Brady et al. | 714/6.12 |
| 6,023,720 A * | 2/2000 | Aref et al. | 718/103 |
| 6,223,252 B1 | 4/2001 | Bandera | |
| 6,922,752 B2 * | 7/2005 | Uysal et al. | 711/114 |
| 7,120,826 B2 * | 10/2006 | Fore et al. | 714/6.2 |
| 7,146,524 B2 * | 12/2006 | Patel et al. | 714/6.23 |
| 7,188,212 B2 * | 3/2007 | Hajji | 711/114 |
| 7,213,165 B2 * | 5/2007 | Umberger et al. | 714/6.32 |
| 7,418,624 B2 * | 8/2008 | Ichikawa et al. | 714/5.11 |
| 7,434,090 B2 * | 10/2008 | Hartung et al. | 714/6.2 |
| 7,434,097 B2 * | 10/2008 | Guha et al. | 714/6.32 |
| 7,502,955 B2 * | 3/2009 | Ishikawa et al. | 714/6.21 |
| 7,574,623 B1 * | 8/2009 | Goel et al. | 714/47.2 |
| 7,587,626 B2 | 9/2009 | Terry | |
| 2005/0283655 A1 * | 12/2005 | Ashmore | 714/7 |
| 2007/0101187 A1 * | 5/2007 | Daikokuya et al. | 714/6 |
| 2007/0101188 A1 * | 5/2007 | Lin | 714/6 |

* cited by examiner

*Primary Examiner* — Bryce Bonzo
*Assistant Examiner* — Elmira Mehrmanesh
(74) *Attorney, Agent, or Firm* — Prakash Nama; Global IP Services, PLLC

(57) ABSTRACT

A system and method of creating an extra redundancy in a RAID system is disclosed. In one embodiment, one or more RAID arrays are created. Each RAID array comprises a plurality of disk drives. Further, a respective dedicated hot spare is created for each RAID array. Furthermore, data is copied from each RAID array to the respective dedicated hot spare using a copyback process based on a predetermined controller usage threshold value.

16 Claims, 3 Drawing Sheets

DISK DRIVE 0

DISK DRIVE 1

DISK DRIVE 2

↙ 100

METHOD AND SYSTEM FOR EXTRA REDUNDANCY IN A RAID SYSTEM

BACKGROUND

Information handling systems, such as data processing systems and computer systems, typically include storage disk drives (e.g., an array of disk drives). For example, disk drives may be communicatively coupled to the information handling system for data storage and retrieval. The disk drives are utilized with the information handling systems to increase data availability and storage capacity, to provide performance flexibility, and to increase data protection.

As the number of disk drives on a RAID system increases, the bit error rate per disk drive also increases and on the other hand the likelihood of disk drives prone to faults and failures also increases. In existing methods, one or more of the disk drives may be configured as a hot spare. The hot spare operates as a replacement disk drive when a failure of a disk drive occurs. Thus, the hot spare generally sits idle until one of the disk drives physically fails which causes the hot spare to be rebuilt as a copy of the failed disk drive. In this case, rebuilds can take an enormous amount of time which costs valuable time to customers and factory production environments. A smaller disk drive will take lesser time to rebuild compared to a larger disk drive. For example, when RAID technology was introduced, the disk drive sizes were in the range of approximately 36 GB, and since then the sizes have crossed that mark and the disk drives today are in magnitude of much more than 500 GB and even terabytes. Hence in case of a disk drive failure, the rebuild time for such a disk drive can even take few days. In this case, for instance, a hot spare kicks in and starts rebuilding from the other disk drive in the RAID array. Further, if another disk drive in the RAID array fails while the hot spare is rebuilding, this will be a catastrophic situation which will result in data loss.

Since the rebuild does not begin until the disk drive actually fails, the system typically has to devote several resources and processing time to rebuilding the disk drive under a standard rebuild algorithm. In addition to the time and resources consumed during a failed disk drive rebuild, the potential for loss of data or other information can be significantly increased. This loss of data may be more significant if the failed disk drive happens to be in a RAID 0 stripe set.

BRIEF DESCRIPTION OF THE DRAWINGS

Various embodiments are described herein with reference to the drawings, wherein.

Figure 1:
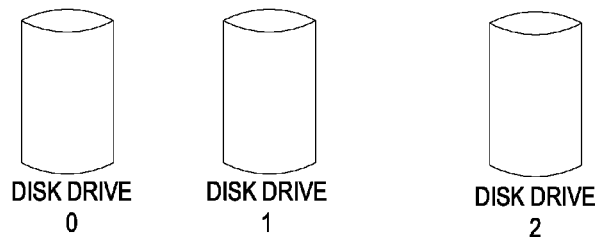
FIG. 1 illustrates an exemplary RAID system with 3 disk drives, in the context of the present disclosure.

The drawings described herein are for illustration purposes only and are not intended to limit the scope of the present disclosure in any way.

DETAILED DESCRIPTION

A system and method for extra redundancy in a RAID system is disclosed. in the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

The present subject matter provides a method to have a fast rebuild of a hot spare to replace the failed disk drive in a RAID array and hence saves the data even when the other disk drive fails in a quick span of time. The present subject matter makes use of the controller resources when no processes are running on the RAID controller. For example, when a dedicated hot spare is assigned to the RAID array, the hot spare is coded in such a way that it can store the data of one of the disk drives (of redundant RAID). In one aspect, the RAID controller issues a write request to the dedicated hot spare based on available controller resources, and then the data is written to the dedicated hot spare, i.e., the dedicated hot spare includes the same data as the other disk drives in the RAID array. In another aspect, if a dedicated hot spare is assigned after some time when data has already been written to the disk drives of the RAID array, then the RAID controller takes care of writing the latest data first to the new dedicated hot spare and issuing a write request for the left over data whenever the RAID controller is free.

In the document, the terms "disk drives" and "RAID drives" are used interchangeably throughout the document. Further, the terms virtual drive (VD) refers to a RAID array with online disk drives excluding the dedicated hot spare and the terms "VD" and "RAID array" are used interchangeably throughout the document. Furthermore, the terms "dedicated hot spare", and "hot spare" are used interchangeably throughout the document.

The "copyback process" includes two methods. In a first method, the "copyback process" copies data from an online disk drive (i.e., a hot spare drive earlier) to a newly inserted disk drive. After successful completion, the newly inserted disk drive becomes online (part of the RAID array) while the online disk drive becomes hot spare/unconfigured good disk drive. For example, consider a RAID 1 array having a hot spare drive (say pd2) as shown below.

|        | Slot0 | Slot1 | Slot2     |
|--------|-------|-------|-----------|
| RAID 1 | Pd0   | Pd1   | Pd2 (HSP) |

If the disk drive Pd1 fails, the hot spare Pd2 will start rebuilding and after the rebuild completes, the disk drives Pd0 and Pd2 forms the RAID 1 array as shown below.

|        | Slot0 | Slot1 | Slot2 |
|--------|-------|-------|-------|
| RAID 1 | Pd0   | X     | Pd2   |

Now if a new disk drive, say Pd3, is inserted in slot 1, data from the hot spare drive Pd2 starts getting copied (i.e., a copyback) to the new disk drive Pd3. Once the copyback completes the hot spare drive Pd2 becomes again a hot spare automatically and the RAID 1 array looks as follows:

|       | Slot0 | Slot1 | Slot2     |
|-------|-------|-------|-----------|
| RAID 1| Pd0   | Pd3   | Pd2 (HSP) |

In a second method, the "copyback process" copies data from a disk drive of the RAID array to a hot spare drive. After successful completion, the hot spare drive includes the same data as that of the disk drive. For example, consider a RAID 1 array having 2 disk drives (say Pd0 and Pd1) and a hot spare drive Pd2 as follows.

|        | Slot 0 | Slot 1 | Slot2                                            |
|--------|--------|--------|--------------------------------------------------|
| RAID 1 | Pd0    | Pd1    | Pd2 (a hot spare PD or any other unconfigured disk drive) |

In this case, a user can select any disk drive (say Pd0) and start a copyback process (e.g., provided by HBA management software) on the hot spare drive Pd2. Upon the successful completion, the RAID 1 array will be formed with the disk drives Pd1 and Pd2 having same data and the disk drive Pd0 will become unconfigured good drive. This forms the basis of the following subject matter as the disk drive Pd0 is the predictive/smart failure drive. The following subject matter uses the second method in an automated way as explained with respect to FIGS. 1-4.

Furthermore, the term "rebuild" refers to an operation wherein if a disk drive (which is a part of a RAID array) fails, the data gets reconstructed from other disk drives on a new disk drive when inserted in the same slot. For example, consider a RAID 1 array having 2 disk drives (say Pd0 and Pd1) as follows.

|        | Slot 0 | Slot 1 |
|--------|--------|--------|
| RAID 1 | Pd0    | Pd1    |

Now in case if the disk drive Pd1 fails, and a new disk drive (say Pd2) is inserted in that slot, the new disk drive Pd2 starts rebuilding from the disk drive Pd0 (i.e., for the RAID 1 array it is a simple copy). Once the rebuilding operation completes the RAID 1 array forms with the disk drives Pd0 and Pd2 and looks as follows.

|        | Slot 0 | Slot 1 |
|--------|--------|--------|
| RAID 1 | Pd0    | Pd2    |

FIG. 1 illustrates a RAID system 100 with 3 disk drives say disk drive 0, disk drive 1 and disk drive 2, in the context of the present disclosure. In this case, a RAID 1 array (e.g., virtual drive) with two disk drives, i.e., disk drive 0 and disk drive 1, is created and the disk drive 2 is reserved as a hot spare to this virtual drive (VD). The data is written to the disk drive 0 and the disk drive 1 at the same rate, because of the RAID level 1, which is nothing but a mirroring of data. Therefore, both the disk drives 0 and 1 are equally susceptible to errors, and when errors get induced into a disk drive, the probability of failure of the disk drive increases. In case one of the disk drives (e.g., disk drive 1) fails in the RAID system 100, the hot spare 2 will kick in and start rebuilding from the other disk drive (e.g., disk drive 0) in the VD. This rebuild will take a significant amount of time depending on the size of the VD and the I/O size being written. Since both the disk drives (i.e., the disk drive 0 and disk drive 1) may have a similar probability of failure, a situation that while the hot spare 2 is rebuilding, the other disk drive (i.e., disk drive 0) fails may arise. This will be a catastrophic situation which will result in data loss.

This present subject matter provides a method for fast rebuild of the hot spare 2 which takes considerably less time and hence avoids any catastrophe situation. This method includes an intelligence of the copyback process to help saving the data in this scenario. In a normal copyback process, say the RAID 1 array is formed with the disk drive 0 and the disk drive 1 and a hot spare 2 is dedicated to the RAID 1 array. In this case, when one of the disk drives has a predictive failure (i.e., SMART-failure), copyback starts on the hot spare 2 to replace the failed disk drive. During copyback if there is any data to be written to the VD (or any I/O), it is actually written to the 3 disk drives instead of only the two disk drives (i.e., the disk drives 0 and 1 of the VD). These 3 disk drives include the two disk drives (i.e., the disk drives 0 and 1) of the VD and the hot spare 2 which is under the process of copyback.

The present disclosure provides the dedicated hot spare 2 for the VD formed with the disk drives 0 and 1. Since the hot spare 2 is the dedicated hot spare, it can be used only for the VD. In case of a failure in one of the disk drive of the VD, the hot spare 2 replaces the failed disk drive of the VD. Hence, if the data that is being written to the 2 disk drives of the VD is written to the dedicated hot spare 2, then the hot spare 2 will be available all the time with the data. The process of writing the data to the dedicated hot spare using the copyback process is explained in detail in FIG. 2.

Figure 2:
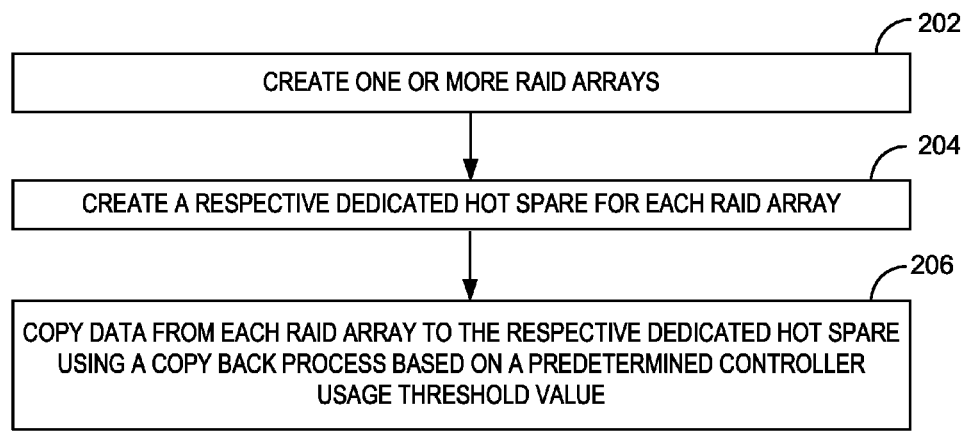
FIG. 2 illustrates a flow chart for creating an extra redundancy in a RAID system, according to one embodiment.

FIG. 2 illustrates a flow chart 200 for creating an extra redundancy in a RAID system, according to one embodiment. In step 202, one or more RAID arrays are created. Each RAID array includes a plurality of disk drives. In one example embodiment, the RAID array can include but not limited to a RAID 1 array, a RAID 5 array, a RAID 6 array, a RAID 10 array, and a RAID PRL 11 array.

Figure 3:
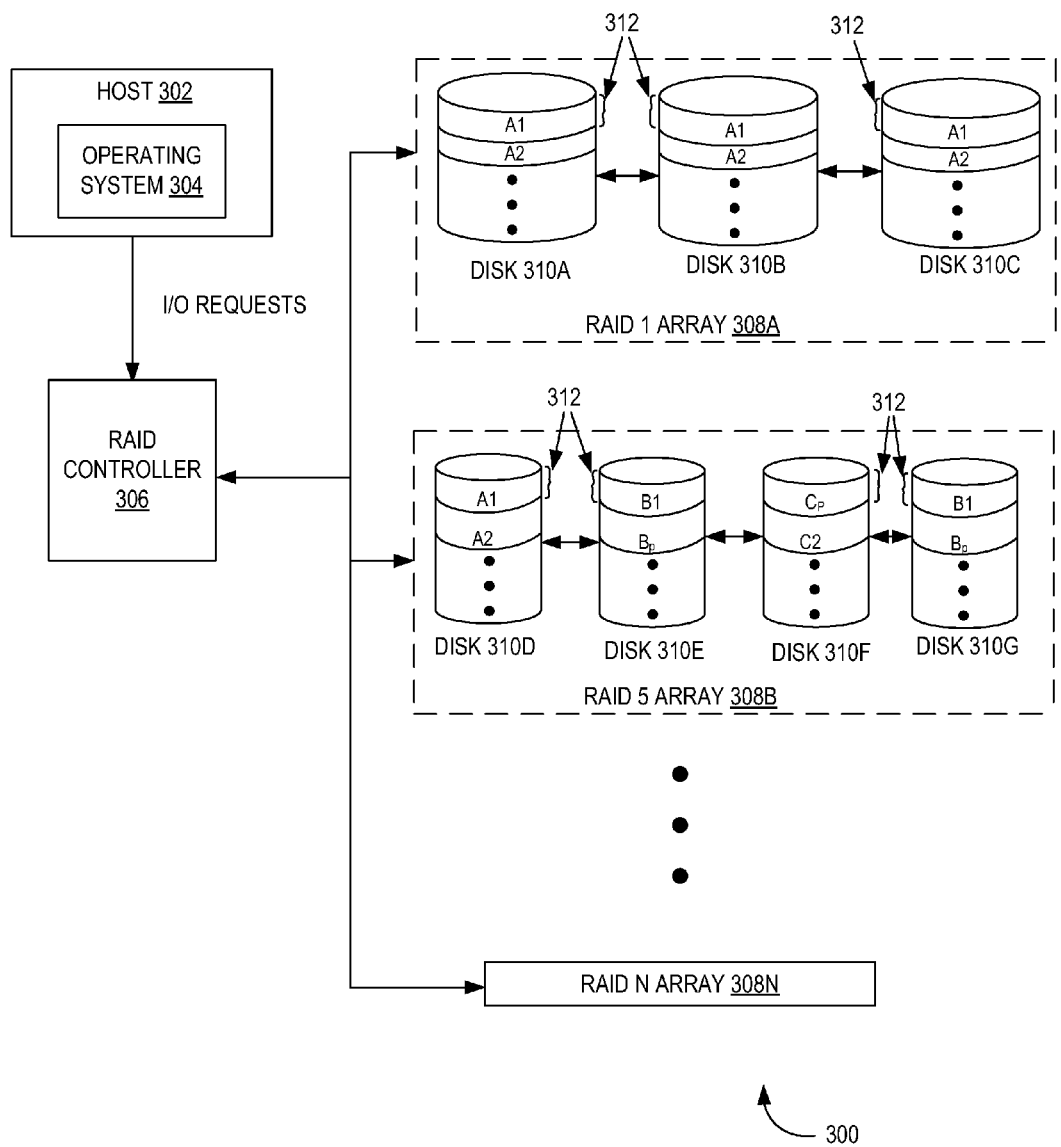
FIG. 3 illustrates a block diagram of a computer system having one or more RAID arrays including disk drives showing strip by strip copyback process, according to one embodiment.

In step 204, a respective dedicated hot spare is created for each RAID array. In one example embodiment, more than one dedicated hot spare can also be created for each RAID array. In step 206, data from each RAID array is copied to the respective dedicated hot spare using a copyback process based on a predetermined controller usage threshold value. In these embodiments, the predetermined controller usage threshold value is identified by a RAID controller prior to initiating the copyback process. In one example embodiment, the predetermined controller usage threshold value includes a number of I/O requests initiated by an operating system on the RAID controller (e.g., as illustrated in FIG. 3).

In these embodiments, when there are no I/O requests, the data is copied from one of the disk drives of each RAID array on strip-by-strip basis to the respective dedicated hot spare. In an example embodiment, the data is copied from one of the plurality of disk drives which is likely to fail from each RAID array on strip-by-strip basis to the respective dedicated hot spare when there are no I/O requests.

In one embodiment, when the number of I/O requests is less than or equal to the predetermined controller usage threshold value, the data is copied on a strip-by-strip basis to each RAID array and the respective dedicated hot spare upon receiving a write request. In another embodiment, when the number of I/O requests is less than or equal to the predetermined controller usage threshold value, the data is copied from one of the disk drives of each RAID array to the respective dedicated hot spare.

In yet another embodiment, when the number of I/O requests is less than or equal to the predetermined controller usage threshold value, copying of data on a strip-by-strip basis to each RAID array and the respective dedicated hot spare upon receiving a write request and copying of data from one of the disk drives of each RAID array to the respective dedicated hot spare are performed simultaneously.

Further in these embodiments, when the number of I/O requests is above the predetermined usage threshold value, then the copyback process is paused or terminated.

FIG. 3 illustrates a block diagram 300 of a computer system having one or more RAID arrays including disk drives showing strip-by-strip copyback process, according to one embodiment. Particularly, FIG. 3 illustrates a host 302, an operating system 304 residing in the host 302, a RAID controller 306, RAID arrays 308A-N having an associated plurality of disk drives 310A-G. Also, each of the disk drives includes strips 312 and the data is copied to the disk drives on strip-by-strip basis. In one example embodiment, once the RAID array is created then a strip size of the strips 312 is also defined (e.g., in terms of 8 KB to 1 MB).

Referring to FIG. 3, each of the RAID arrays 308A-N preferably includes an array of disk drives. In an example embodiment illustrated in FIG. 3, the RAID 1 array 308A includes disk drives 310A, 310B, and 310C, and the RAID 5 array 308B includes disk drives 310D, 310E, 310F, and 310G. The RAID 1 array 308A and the RAID 5 array 308B are shown for illustrative purpose and the RAID array can also include other RAID levels such as a RAID 6 array, a RAID 10 array, a RAID PRL 11 array, and the like. The disk drives are commonly used on servers but may be used with any information handling systems such as data processing systems and the like. In some embodiments of the present disclosure, the RAID controller 306 may include a computer readable medium to associate with another computer readable medium of each disk drive for managing each of the disk drives.

The RAID controller 306 includes intelligence for rebuilding the failing disk drive or disk drive with a reported error in a pre-emptive smart error rebuild, thereby creating an intelligent hot spare. In some embodiments, each RAID array includes at least one disk drive configured as a "hot spare" drive. For example, the disk drive 310C is configured as a hot spare for the RAID 1 array 308A and the disk drive 310G is configured as a hot spare for the RAID 5 array 308B. In general, the remaining disk drives (such as RAID disk drives 310A and 310B in case of RAID 1 array and 310D, 310E, and 310F in case of the RAID 5 array) operate to store data for the data processing system (such as data processing system 400 of FIG. 4). In other embodiments, the RAID controller 306 may configure more than one disk drive to function as a "hot spare" drive. For example, when one of the disk drives (e.g., disk drive 310E of RAID 5 array 308B) has a predictive failure (i.e., SMART-failure), copyback starts on the hot spare 310G to replace the failed disk drive 310E as illustrated in FIG. 3.

With respect to the above described embodiments of FIGS. 1-3, writing data to the dedicated hot spare (e.g., the dedicated hot spare 2 of FIG. 1) is performed as a low priority task. At every instant, the RAID controller 306 can include a large number of I/O requests to process, each operation in the RAID controller 306 is given a certain preference, say for example, providing an option for selecting the rebuild rate as 30% or 100%, which in turn means how much of controller resources will be spent on the process. In one embodiment, the data I/O requests in the RAID array will be given a highest preference and the I/O requests to the dedicated hot spare 2 will be given a low priority compared to the I/O requests to the actual disk drives of the VD. For example, in case of RAID 1 array 308A, the data I/O requests to the disk drives 310A and 310B will be given a highest preference and the I/O requests to the dedicated hot spare 310C will be given a low priority compared to the write request to the actual disk drives 310A and 310B of the RAID 1 array.

The following description is provided as an example for RAID 1 array 308A; however this process can also be implemented for other RAID levels. In one embodiment, when the RAID controller 306 processes less number of I/O requests than the predetermined controller usage threshold value (i.e., when the RAID controller 306 is executing minimal I/O requests from the operating system 304 of the host 302) and no other operation is being run by the RAID controller 306, the data will be written to all the disk drives (i.e., the disk drives 310A, 310B, and 310C). Further, all the pending data write requests to the hot spare 310C can also be issued at this point of time. Furthermore, if there is no pending data write requests to the hot spare 310C then nothing is written and new write requests are allowed to accumulate to some degree. Accordingly the disk drives are only written in burst mode which gives an option to spin them down and hence saves power. Finally, the disk drives 310A and 310B and the dedicated hot spare 310C will have the same data written to them.

In another embodiment, when the RAID controller 306 processes more I/O requests than the predetermined controller usage threshold value (i.e., when the RAID controller 306 is overloaded with I/O requests) on many RAID arrays along with many background operations, the data on an affected RAID array will be written only to the online disk drives of the affected RAID array (i.e., the disk drive 310A and the disk drive 310B). At this point of time, the I/O requests to the dedicated hot spare 310C will be stopped and they will be kept pending by the RAID controller 306 till the RAID controller 306 is freed up of the resources. Once the RAID controller 306 is freed up, it will start copying the left over data from one of the online disk drives 310A and 310B of the RAID 1 array 308A to the dedicated hot spare 310C. Therefore, the performance of the RAID controller 306 is not affected in real time scenario.

Figure 4:
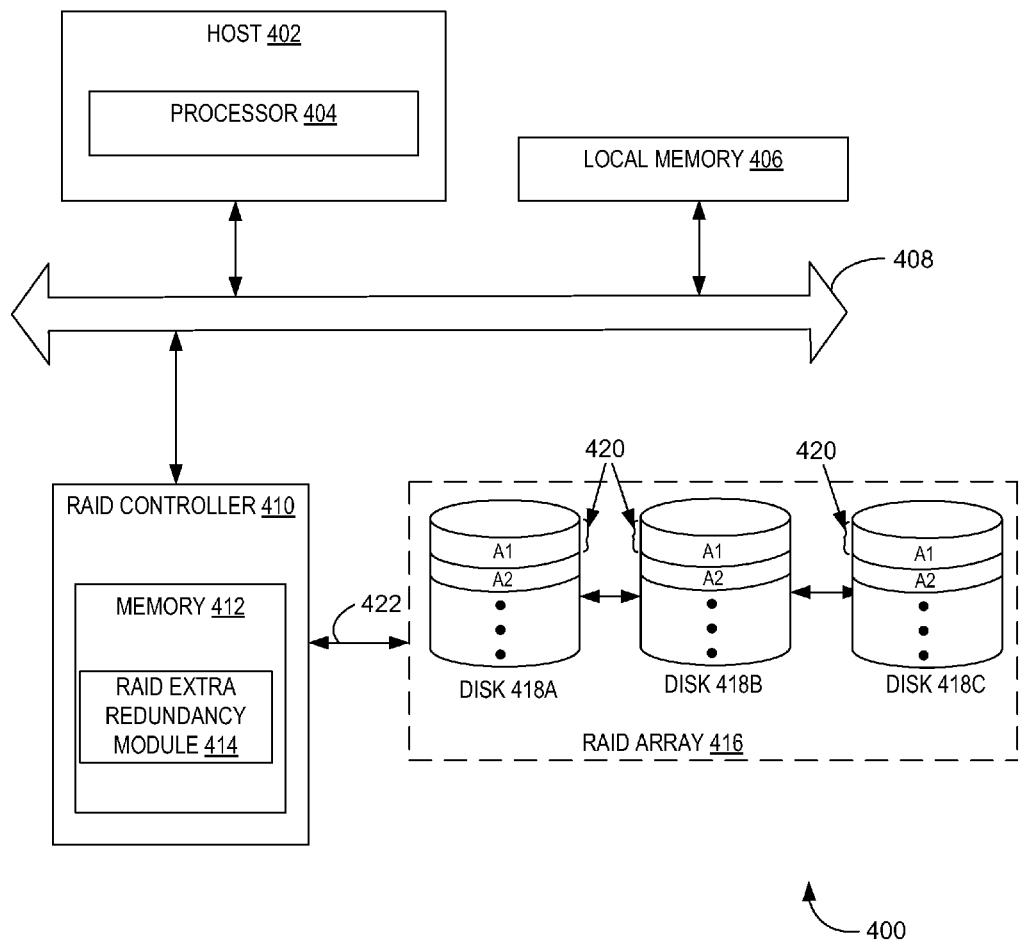
FIG. 4 illustrates a diagrammatic system view of a data processing system in which any of the embodiments disclosed herein may be performed, according to one embodiment.

FIG. 4 illustrates a diagrammatic system view of a data processing system 400 in which any of the embodiments disclosed herein may be performed, according to one embodiment. Particularly, FIG. 4 illustrates the data processing system 400 including a disk array storage subsystem in which a preferred embodiment of the present invention may be implemented is depicted. The data processing system 400 includes a host 402 including a processor 404, a local memory 406, a system bus 408, a RAID controller 410, and a RAID array 416. The RAID controller 410 includes memory 412 and a RAID extra redundancy module 414 residing in the memory 412. The RAID array 416 includes a plurality of disk drives 418A-C and the data is copied to each of the disk drives on strip by strip basis (e.g., strips 420 as shown in FIG. 4).

The processing unit or processor 404 may include the hardware architecture necessary to retrieve executable code from the local memory 406 and execute the executable code. The executable code may, when executed by the processing unit 404, cause the processing unit 404 to implement at least the functionality of creating a dedicated hot spare and copying data from the RAID array to the dedicated hot spare using a copyback process according to the methods of the present specification described below. In the course of executing code, the processing unit 404 may receive input from and provide output to one or more of the remaining hardware units.

The local memory 406 may be configured to digitally store data consumed and produced by the processing unit 404. The local memory 406 may also include various types of memory modules, including volatile and nonvolatile memory. For example, the local memory 406 of the present example includes Random Access Memory (RAM), Read Only Memory (ROM), and Hard Disk Drive (HDD) memory. Many other types of memory are available in the art, and the present specification contemplates the use of any type(s) of memory in the local memory 406 as may suit a particular application of the principles described herein. In certain examples, different types of memory in the local memory 406 may be used for different data storage needs. For example, in certain embodiments the processing unit 404 may boot from ROM, maintain nonvolatile storage in the HDD memory, and execute program code stored in RAM.

In an example embodiment, the processor 404 is connected to a system bus 408. In another example embodiment, the processor 404 is connected to a level two (L2) cache (not shown), which is connected in turn to the system bus 408. Also, the local memory 406 and the RAID controller 410 are connected to the system bus 408. In addition, the data processing system 400 may include other components not shown, such as input/output devices in the form of a keyboard, pointing device such as a mouse or trackball, and the like. The exemplary embodiment is provided solely for the purposes of describing and explaining the invention, and is not meant to imply architectural limitations.

In one embodiment, the RAID controller 410 controls data transactions between the remainder of data processing system 400 and the disk drives 418A-418C within the RAID array 416. The RAID array 416 including the disk drives 418A-418C is coupled to the RAID controller 410 by an internal bus 422.

In accordance with the present invention, the RAID array 416 includes the disk drives 418A and 418B, and at least one hot spare 418C, and the functionality described below for selection and data mirroring of a selected disk drive among drives 418A-B within the RAID array 416. In one embodiment, the hot spare 418C is dedicated to the RAID array 416.

In the example embodiment illustrated in FIG. 4, the system 400 includes the RAID controller 410 communicatively coupled to the RAID array 416. The system 400 also includes an operating system coupled to the RAID controller 400. In one example embodiment, the operating system may reside in the host 402. The system 400 also includes memory 412 residing in the RAID controller 410. The memory 412 includes the RAID extra redundancy module 414 having instructions capable of creating one or more RAID arrays. The RAID array 416 shown for illustrative purpose in the example embodiment of FIG. 4 is RAID 1 array. However, the RAID array 416 also includes other RAID levels such as a RAID 5 array, a RAID 6 array, a RAID 10 array, and/or a RAID PRL 11 array. The RAID array 416 includes a plurality of disk drives (e.g., the disk drives 418A and 418B).

The RAID extra redundancy module 414 also include instructions capable of creating a respective dedicated hot spare (e.g., the disk drive 418C) for each RAID array 416 and copying data from each RAID array 416 to the respective dedicated hot spare 418C using a copyback process based on a predetermined controller usage threshold value. In one embodiment, the predetermined controller usage threshold value is based on a number of I/O requests (e.g., as illustrated in FIG. 3) initiated by the operating system (residing in the host 402) on the RAID controller 410.

In these embodiments, contemporary magnetic disk drives, through integrated drive controller logic (not shown), collect a variety of error information relating to operation of the respective disk and store such error information in an accessible manner. Such information may be queried by the RAID controller 410 and employed to identify the disk drive among disk drives 418A and 418B which is likely to fail.

An article comprising a non transitory computer readable storage medium having instructions thereon which when executed by a computer, cause the computer to perform the above described method. The method described in the foregoing may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

In various embodiments, the methods and systems described in FIGS. 1 through 4 may allow faster rebuild and saving a lot of time in a larger RAID array size disk groups. The above described methods and systems will also protect the user from loss of data due to multiple disk drive failures in a RAID array.

Further, the methods and systems described in FIGS. 1 through 4 can be used in any storage appliance, storage based applications which remains idle periodically, applications related to accounting, payroll, financial etc, Intranet servers, and database servers.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method for an extra redundancy in a RAID system, comprising:
   creating one or more RAID arrays, wherein each RAID array comprises a plurality of disk drives;
   creating a respective dedicated hot spare for each RAID array; and
   copying data from each RAID array to the respective dedicated hot spare using a copyback process based on a predetermined controller usage threshold value, wherein the copyback process comprises copying data from one of the plurality of disk drives which has a predictive failure in each RAID array on strip-by-strip basis to the respective dedicated hot spare, wherein the predetermined controller usage threshold value is based on a number of I/O requests initiated by an operating system on a RAID controller, and wherein the copyback process comprises:

substantially simultaneously writing data on a strip-by-strip basis to each RAID array and the respective dedicated hot spare upon receiving a write request when the number of I/O requests is less than or equal to the predetermined controller usage threshold value.

2. The method of claim 1, wherein each RAID array comprises an array selected from the group consisting of a RAID 1 array, a RAID 5 array, a RAID 6 array, a RAID 10 array, and a RAID PRL 11 array.

3. The method of claim 1, wherein the copyback process comprises:

copying data from the one of the plurality of disk drives of each RAID array on strip-by-strip basis to the respective dedicated hot spare when there are no I/O requests.

4. The method of claim 1, wherein the copyback process further comprises:

copying data from the one of the plurality of disk drives of each RAID array to the respective dedicated hot spare when the number of I/O requests is less than or equal to the predetermined controller usage threshold value.

5. A method for an extra redundancy in a RAID system, comprising:

creating one or more RAID arrays, wherein each RAID array comprises a plurality of disk drives;
creating a respective dedicated hot spare for each RAID array; and
copying data from each RAID array to the respective dedicated hot spare using a copyback process based on a predetermined controller usage threshold value, wherein the predetermined controller usage threshold value is based on a number of I/O requests initiated by an operating system on a RAID controller, and wherein the copyback process comprises:

substantially simultaneously performing copying of data on a strip-by-strip basis to each RAID array and the respective dedicated hot spare upon receiving a write request and copying of data from one of the plurality of disk drives of each RAID array to the respective dedicated hot spare when the number of I/O requests is less than or equal to the predetermined controller usage threshold value.

6. The method of claim 1, further comprising:
pausing or terminating the copyback process when the number of I/O requests is above the predetermined usage threshold value.

7. A system for extra redundancy in RAID system, comprising:

a RAID array;
a RAID controller communicatively coupled to the RAID array;
an operating system coupled to the RAID controller;
memory residing in the RAID controller, wherein the memory includes a RAID extra redundancy module having instructions capable of:
creating one or more RAID arrays, wherein each RAID array comprises a plurality of disk drives;
creating a respective dedicated hot spare for each RAID array; and
copying data from each RAID array to the respective dedicated hot spare using a copyback process based on a predetermined controller usage threshold value, wherein the copyback process comprises copying data from one of the plurality of disk drives which has a predictive failure in each RAID array on strip-by-strip basis to the respective dedicated hot spare, wherein the predetermined controller usage threshold value is based on a number of I/O requests initiated by the operating system on the RAID controller, and wherein the copyback process comprises:

substantially simultaneously writing data on a strip-by-strip basis to each RAID array and the respective dedicated hot spare upon receiving a write request when the number of I/O requests is less than or equal to the predetermined controller usage threshold value.

8. The system of claim 7, wherein each RAID array comprises an array selected from the group consisting of a RAID 1 array, a RAID 5 array, a RAID 6 array, a RAID 10 array, and a RAID PRL 11 array.

9. The system of claim 7, wherein the copyback process comprises:

copying data from the one of the plurality of disk drives of each RAID array on strip-by-strip basis to the respective dedicated hot spare when there are no I/O requests on the RAID controller.

10. The system of claim 7, wherein the copyback process further comprises:

copying data from the one of the plurality of disk drives of each RAID array to the respective dedicated hot spare when the number of I/O requests is less than or equal to the predetermined controller usage threshold value.

11. The system of claim 7, further comprising:
pausing or terminating the copyback process when the number of I/O requests on the RAID controller is above the predetermined usage threshold value.

12. A system for extra redundancy in RAID system, comprising:

a RAID array;
a RAID controller communicatively coupled to the RAID array;
an operating system coupled to the RAID controller;
memory residing in the RAID controller, wherein the memory includes a RAID extra redundancy module having instructions capable of:
creating one or more RAID arrays, wherein each RAID array comprises a plurality of disk drives;
creating a respective dedicated hot spare for each RAID array; and
copying data from each RAID array to the respective dedicated hot spare using a copyback process based on a predetermined controller usage threshold value, wherein the predetermined controller usage threshold value is based on a number of I/O requests initiated by the operating system on the RAID controller, and wherein the copyback process comprises:
simultaneously performing copying of data on a strip-by-strip basis to each RAID array and the respective dedicated hot spare upon receiving a write request and copying of data from one of the plurality of disk drives of each RAID array to the respective dedicated hot spare when the number of I/O requests is less than or equal to the predetermined controller usage threshold value.

13. A non-transitory computer-readable storage medium for creating an extra redundancy in a RAID system having instructions that, when executed by a computing device, cause the computing device to perform a method comprising:

creating one or more RAID arrays, wherein each RAID array comprises a plurality of disk drives;
creating a respective dedicated hot spare for each RAID array; and copying data from each RAID array to the respective dedicated hot spare using a copyback process based on a predetermined controller usage threshold value, wherein the copyback process comprises copying data from one of the plurality of disk drives which has a predictive failure in each RAID array on strip-by-strip basis to the respective dedicated hot spare, wherein the predetermined controller usage threshold value is based on a number of I/O requests initiated by an operating system on a RAID controller, and wherein the copyback process comprises:
   substantially simultaneously writing data on a strip-by-strip basis to each RAID array and the respective dedicated hot spare upon receiving a write request when the number of I/O requests is less than or equal to the predetermined controller usage threshold value.

14. The non-transitory computer-readable storage medium of claim 13, wherein the copyback process comprises:
   copying data from the one of the plurality of disk drives of each RAID array on strip-by-strip basis to the respective dedicated hot spare when there are no I/O requests.

15. The non-transitory computer-readable storage medium of claim 13, further comprising:
   pausing or terminating the copyback process when the number of I/O requests is above the predetermined usage threshold value.

16. A non-transitory computer-readable storage medium for creating an extra redundancy in a RAID system having instructions that, when executed by a computing device, cause the computing device to perform a method comprising:

creating one or more RAID arrays, wherein each RAID array comprises a plurality of disk drives;
creating a respective dedicated hot spare for each RAID array; and
copying data from each RAID array to the respective dedicated hot spare using a copyback process based on a predetermined controller usage threshold value, wherein the predetermined controller usage threshold value is based on a number of I/O requests initiated by an operating system on a RAID controller, and wherein the copyback process comprises one of:
   copying data on a strip-by-strip basis to each RAID array and the respective dedicated hot spare upon receiving a write request when the number of I/O requests is less than or equal to the predetermined controller usage threshold value;
   copying data from one of the plurality of disk drives of each RAID array to the respective dedicated hot spare when the number of I/O requests is less than or equal to the predetermined controller usage threshold value; and
   simultaneously performing copying of data on a strip-by-strip basis to each RAID array and the respective dedicated hot spare upon receiving a write request and copying of data from one of the plurality of disk drives of each RAID array to the respective dedicated hot spare when the number of I/O requests is less than or equal to the predetermined controller usage threshold value.

* * * * *